Nov. 7, 1961   D. J. MARSHALL   3,007,315
POWER ACTUATOR DEVICE
Original Filed March 25, 1959   3 Sheets-Sheet 1
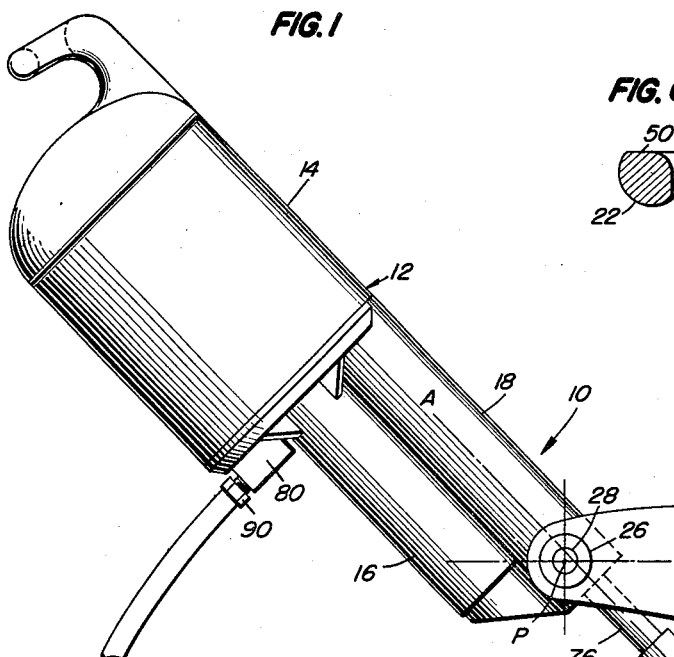
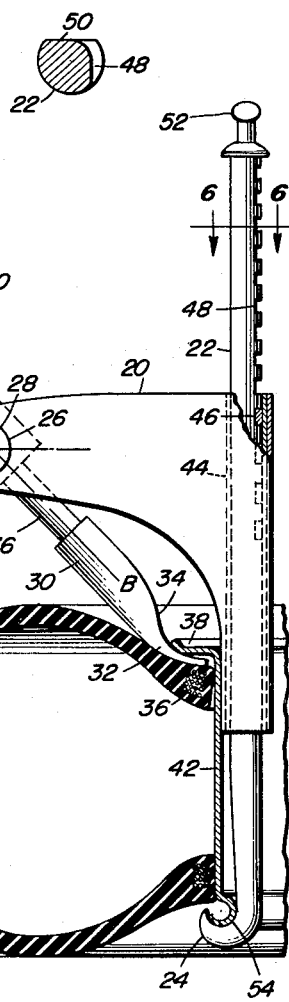
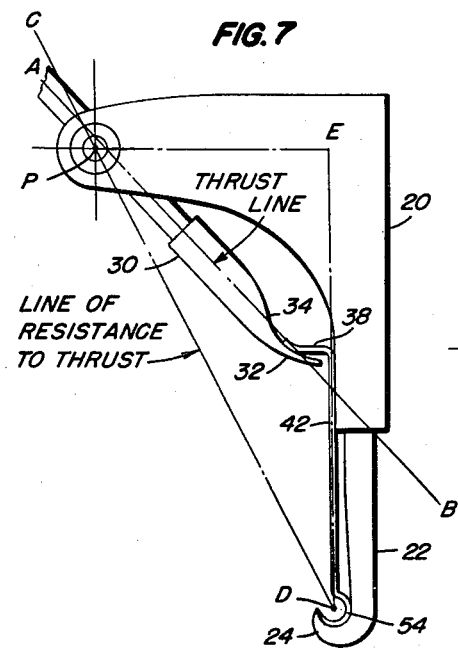
INVENTOR
Don J. Marshall
BY Walter J. Finch
ATTORNEY Nov. 7, 1961      D. J. MARSHALL      3,007,315
POWER ACTUATOR DEVICE
Original Filed March 25, 1959      3 Sheets—Sheet 2
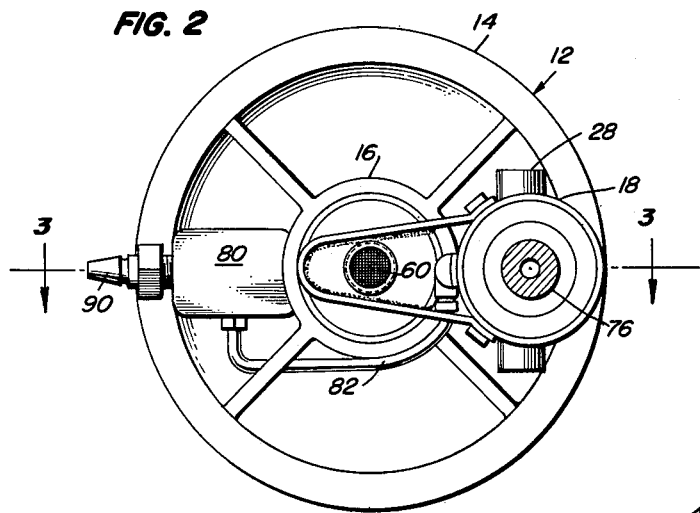
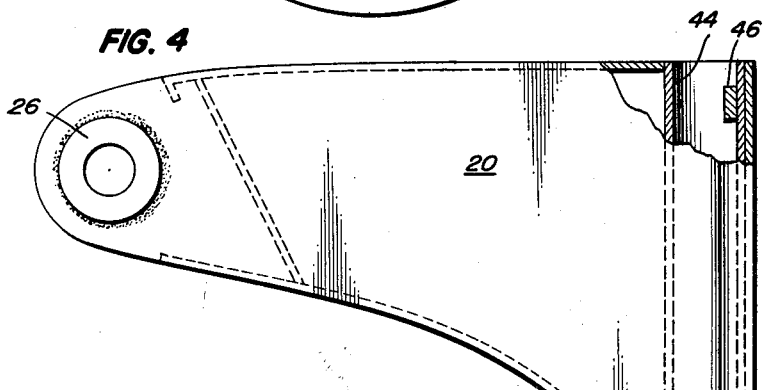
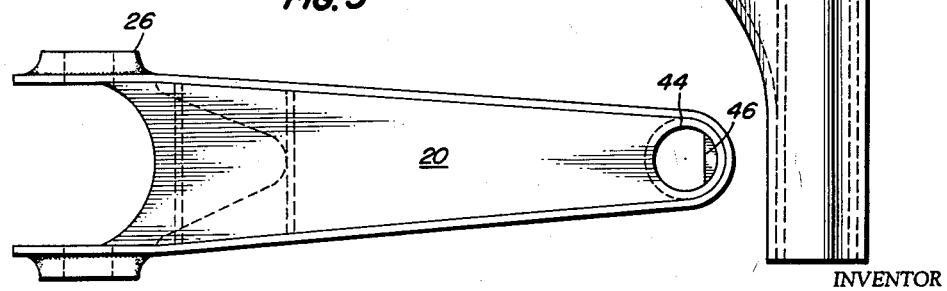
INVENTOR
Don J. Marshall
BY *Walter G. Finch*
ATTORNEY Nov. 7, 1961 D. J. MARSHALL 3,007,315
POWER ACTUATOR DEVICE
Original Filed March 25, 1959 3 Sheets-Sheet 3

INVENTOR
Don J. Marshall

BY Walter G. Finch
ATTORNEY though, as shown in FIGS. 1 and 2, facilitate the adaption
United States Patent Office 3,007,315
Patented Nov. 7, 1961

3,007,315
POWER ACTUATOR DEVICE
Don J. Marshall, 3816 Granada Ave., Baltimore, Md., assignor of fifty percent to Marshall H. Wentz, Baltimore, Md.
Original application Mar. 25, 1959, Ser. No. 801,913. Divided and this application Nov. 18, 1959, Ser. No. 853,796
1 Claim. (Cl. 60—54.5)

This invention relates generally to wheelwright-machines, and more particularly it pertains to the class of tools known as tire removers. This application is a division of U.S. Patent application Serial Number 801,913, filed by Don J. Marshall on March 25, 1959, for "Tire Removing Tool."

Pneumatic tires mounted on metallic rims after a relatively long period of use have a tendency to become very securely bonded to such rims. This bonding of the pneumatic tire to the rim is caused by corrosion of the metal and rust which forms on such rims and adjacent the rim engaging beads of the tire.

This presents no great problem with relatively small tires used on pleasure cars and other relatively small vehicles. However, with the large and heavy tires utilized on trucks and buses, the bonding of the tire to the rim presents a major problem and results in extremely difficult and, at times, dangerous operations in removing the tires from the rims for repair thereof. In many instances, the bonding of the tire to the rim is so secure as to resist a pressure of several thousand pounds per square inch required to break the bond.

Many different types of apparatus and tire removing tools have been developed and used for performing the operations of removing tires from rims. Many of these conventional tire removing tools have proved completely ineffective or inefficient in removing the tire from its rim. In addition, such conventional prior art tire removing tools have resulted in severe injury to the operators thereof. These injuries to the operators have been caused by the tools slipping or becoming detached from the tire rims during the application of rather great pressures to the tools. As a result, the dislodged tools have often struck the operators with relatively great force.

In addition to the above, many of these tire removing tools apply the removing force to the sidewall of the tire rather than to the beads thereof. Since it is well-known that the sidewall of a tire, even in the relatively large sizes utilized in trucks and buses, is relatively weak, the sidewall of the tire is, in many instances, broken and the tire is severely damaged without breaking the bond between the beads of the tire and the rim therefor.

Many of the prior art tools for performing the operation of removing the tire from the rim depend on a leverage action. Consequently, the tire and rim must be securely held to a frame or base, which, in turn, is securely attached to the floor or other part of a building. Since the force utilized in breaking the bond between the tire bead and rim is relatively great, the base of machines of this type must be relatively massive, or a secure foundation must be supplied to which the same is attached, since this base or foundation must provide sufficient strength to resist the total force exerted on the lever which is utilized to operate the machine. This, of course, materially increases the cost of the tool, both the cost of manufacture as well as installation of such a machine or tool.

As a result of the comparative failure of prior art tire removing tools utilized for removing relatively large tires from rims, it is still the common practice for such tires to be removed from the rims by purely manual labor in which pry bars and heavy sledge hammers are utilized to break the bond between the beads of the tire and the rim. In addition to the manual labor required for this operation, a relatively long period of time is consumed. The number of tires, therefore, which may be repaired and serviced by a tireman within the normal work day is materially reduced, with the cost of tire maintenance being materially increased.

Power-operated portable tire removing tools which will safely and efficiently perform this operation of removing tires from rims while reducing the time required therefor, represents a real step forward in the art. From the above, it is obvious that in automotive and vehicle maintenance, a power aided tool is required for the removal of heavy and truck type tires.

It is an object of this invention, therefore, to provide a light weight, inexpensive yet powerful hand-held, pneumatically powered tire removing tool.

Another object of this invention to to provide a tire removing tool combining the advantages of air and hydraulic fluid operation for cushioned high power with power retraction of the tool.

Still another object of the invention is to provide a safe, automatic clamp in a rapid tire removing tool which is readily adjusted for various sizes of tire rims and which can be quickly positioned at various points along the tire bead.

Still another object of this invention is to provide a power operated tire removing tool which consists of a closed theoretical triangle of structural parts including a clevis bracket, a power-operated chisel and a hook rod to achieve a condition where all operating forces work inside of this theoretical triangle, which, when combined with a rotating force developed by the thrust of the chisel of the tool working against an off-centered pivot of the triangle of structural parts forces the clevis bracket against the inner periphery of the rim of a wheel to lock the hook rod of the tool to the rim mounting the tire and render it impossible for the tool to kick-off from the rim when the chisel is under pressure.

These and other objects and advantages of this invention will become more readily apparent and understood from the accompanying specification and drawings in which:

FIG. 1 is a side elevation of a tire removing tool, comprising this invention, partially in cross section, showing its application to a rim-mounted pneumatic tire;

FIG. 2 is a bottom view, partially in cross-section, of the actuator motor assembly shown in FIG. 3;

FIG. 4 is an enlarged side view of a clevis bracket shown in FIG. 1, with parts thereof being broken away;

FIG. 5 is a top view of the clevis bracket of FIG. 4;

FIG. 6 is a cross-section taken along line 6—6 of FIG. 1; and

FIG. 7 is a schematic of the triangle of forces acting on the tire removing tool during operation thereof in removing a tire from a rim.

Figure 3:
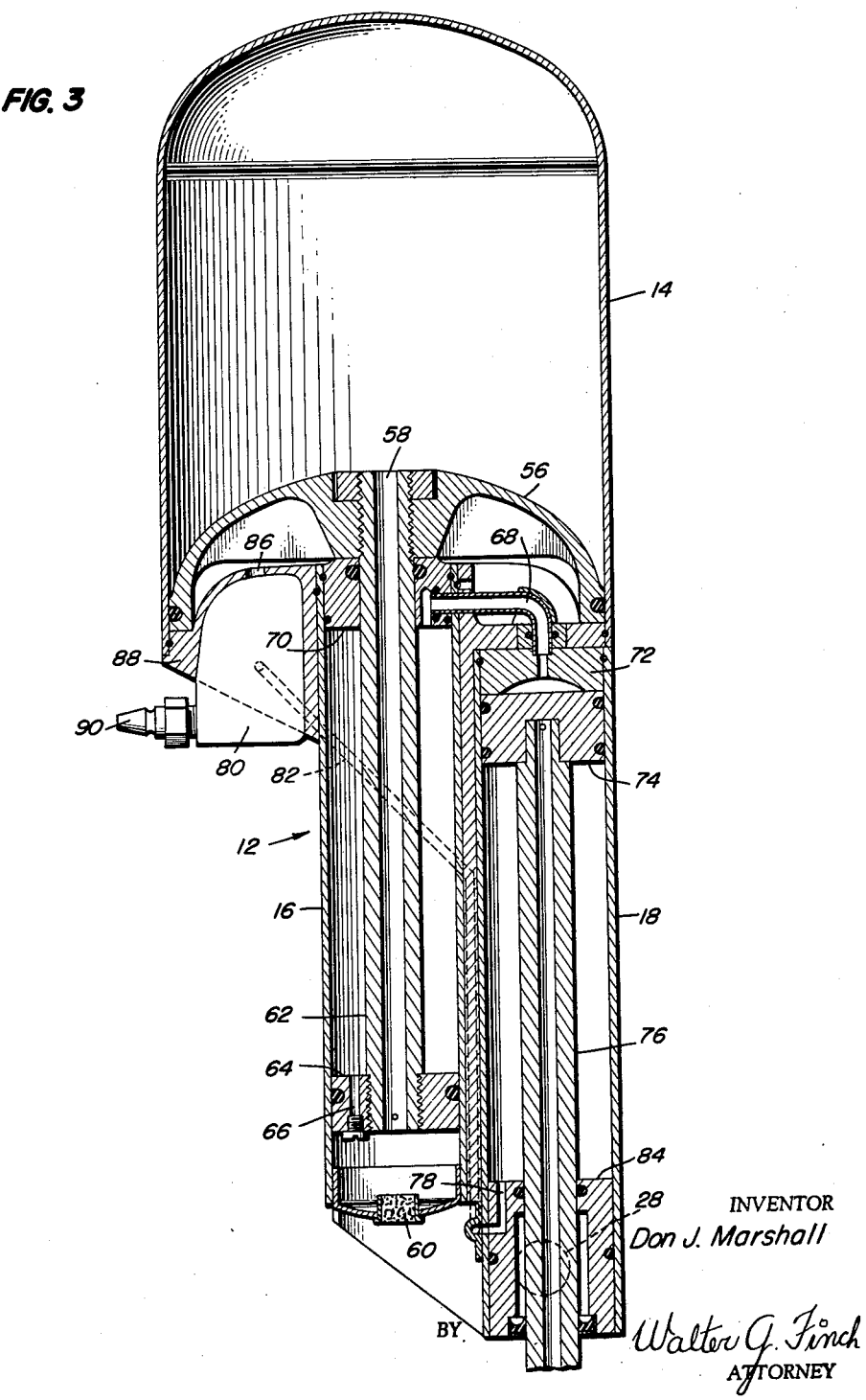
FIG. 3 is a cross-section taken along line 3—3 of FIG. 2.

Referring now to FIG. 1 of the drawing, there is illustrated generally a tire remover tool 10 which basically consists of an actuator motor assembly 12, a pivoted clevis bracket 20 and an adjustable hook rod 22. The actuator motor assembly 12 is provided with a prying chisel 30 at its lower end for insertion between the bead 36 of a tire 40 and the integral bead engaging flange or edge 38 of a rim 42 for mounting the tire.

As shown in FIGS. 1, 4, and 5, a clevis bearing 26 in the clevis bracket 20 and a clevis pivot pin 28 therethrough, as shown in FIGS. 1 and 2, facilitate the adaption of the tire remover tool 10 to a conventional mounted pneumatic tire 40.

The clevis bracket 20, which is illustrated in detail in FIGS. 4 and 5, is provided with a tubular sleeve 44 which provides a sliding fit for the hook rod 22. A series of notches 48, as shown in FIG. 1, are provided along the length of rod 22 to engage with a stud 46 positioned within sleeve 44.

By rotating the rod 22 a quarter of a turn by means of a handle 52, a flat side 50 provided lengthwise of rod 22, as shown in FIG. 6, permits unlocking of one of the notches 48 from stud 46. The rod 22 may thus be extended and relocked so that a hook 24 positioned on its opposite end can be engaged with a rounded edge 54 of the conventional tire rim 42 for the tire 40.

The actuator motor assembly 12, as shown in FIGS. 1, 2, and 3, is provided with a pneumatic cylinder 14, a master hydraulic cylinder 16, and a slave cylinder 18 which cooperate to multiply the force of air pressure applied to the underside of a pneumatic piston 56 for the cylinder 14. As piston 56 moves upwardly in cylinder 14, it carries the piston rod 62 of the master hydraulic cylinder 16 with it. This piston rod 62 is provided with an axial passage 58, so the upper portion of the pneumatic cylinder 14 may be vented therethrough and by means of a filtered aperture 60, located at the lower end of the piston rod 62, vented to the atmosphere.

The hydraulic piston 64, of the master cylinder 16, is fastened to the lower end of the master piston rod 62 by a suitable arrangement as shown, such as by means of mating threads on the piston rod 62 and the piston 64. By means of a fluid filler aperture 66, a suitable hydraulic fluid is introduced and contained within cylinder 16 above the piston 64.

A hydraulic transfer tube 68, attached to the cylinder head 70 of the master cylinder 16 is arranged to communicate with a cylinder head 72 of the slave cylinder 18.

It is to be noted that the orifice leading to the transfer tube 68 is calculated for a metered flow which governs the movement of a slave piston 74 as a safety factor. The slave piston 74 contained within the slave cylinder 18 is provided with a piston rod 76. Piston rod 76 passes through a slave cylinder gland 84, and it is attached at its lower end to the prying chisel 30. Because of the effective relative sizes of the cylinder heads 56, 64, and 74, a multiplication of force in the order of fifty times is easily obtained.

As slave piston 74 moves downwardly in its cylinder 18, the air beneath it in the slave cylinder 18 is forced out therefrom through an air passage 78 and through a return tube 82 where it is vented through a manually operated directional valve 80 to the atmosphere.

Valve 80 is also arranged to direct the flow of air introduced through a compressed air supply fitting 90 so that instead of injecting compressed air into pneumatic cylinder 14 through an air psasage 86 in cylinder head 88, it vents it instead to the atmosphere. At the same time, there is a reversed flow of compressed air in passage 82 which enters the cylinder 18 below piston 74 and forces it upwardly in its cylinder. The displaced hydraulic fluid above piston 74 flows through the transfer tube 68 into the cylinder 16 to force the piston 64 downwardly in its cylinder 16 to carry the pneumatic piston 56 therewith in cylinder 14 in a retract stroke. This back and forth operation of the actuator motor assembly 12 can be repeated as often as desired by manipulating the valve 80 to extend or retract the chisel 30.

An inwardly curved portion 32 of the chisel 30 thus is advanced and forced between the tire bead 36 of the tire 40 and the edge 38 of the rim 42. A concave ramp 34 formed on the body of chisel 30 provides a prying force against rim edge 38 to break the tire bead 36 of the tire 40 loose from the edge 38 of the rirm 42 and slide it along the rim.

Referring now to the triangle of forces of FIG. 7, the pivotal center point P of clevis pivot pin 28 is located off the thrust line A—B of piston rod 76 toward the tire 40 to provide a safety torque action.

A rigid right triangle P—E—D exists in the structure consisting of the clevis bracket and the hook rod 22. With the thrust line A—B extending within the line of resistance to thrust line P—D as shown, bracket 20 tends to rotate to the left around point D, which is the center of hook 54, and thus tending to hold bracket 20 firmly against rim 42 in a self clamping action.

It can be seen that this important feature of the invention prevents a dangerous kick-off of the tool 10 which otherwise might occur due to the great force of several tons exerted by chisel 30 against the rim 42.

While there has been described and illustrated herewith the preferred form of the invention it should be understood in the light of these teachings that within the scope of the appended claim the invention may be practiced otherwise than as specifically described.

What is claimed is:

A pneumatic-hydraulic actuator assembly for actuating a tool, comprising, a pneumatic cylinder arrangement, a master hydraulic cylinder arrangement, and a slave cylinder arrangement, said slave piston arrangement being laterally spaced from said master cylinder arrangement, each said cylinder arrangement being provided with a cylinder and a piston, a piston rod integrally connecting together the pistons of said pneumatic and master cylinder arrangements, said piston rod having a passage therein for venting the chamber of said pneumatic cylinder opposite the piston rod side thereof to atmosphere, said slave cylinder arrangement being provided with a piston rod connecting the piston of said slave cylinder arrangement with said tool to be extended and retracted, the chamber of the master cylinder on the piston rod side of said master cylinder arrangement having a hydraulic medium therein, said chamber being arranged to communicate hydraulically with the chamber of the slave cylinder located on the opposite side of the piston rod of said slave cylinder arrangement, means for providing a metered flow of hydraulic fluid to said chamber of said slave cylinder to govern the movement of said slave piston, means for introducing a pneumatic medium in the chamber of said pneumatic cylinder arrangement to cause the piston thereof to apply pressure to the hydraulic medium in said master and slave cylinder arrangements so as to extend said tool, and means for changing the flow of the pneumatic medium to the piston rod side of the slave cylinder arrangement to retract said tool with the diameter of said piston for said pneumatic cylinder arrangement being of greater diameter than the diameter of said pistons for said master and slave cylinder arrangements so that the relative sizes of said pistons effects a multiplication of force applied to said tool.

References Cited in the file of this patent

UNITED STATES PATENTS

| | | |
|---|---|---|
| 2,169,423 | Kessler et al. | Aug. 15, 1939 |
| 2,437,115 | Muller et al. | Mar. 2, 1948 |
| 2,526,956 | Kugler | Oct. 24, 1950 |
| 2,536,709 | Ashton | Jan. 2, 1951 |
| 2,644,349 | Abrahamsen | July 7, 1953 |
| 2,852,965 | Wallace | Sept. 23, 1958 |